Dec. 4, 1923.  A. A. ASHWORTH ET AL  1,476,321
OIL GAUGE
Filed Feb. 6, 1922
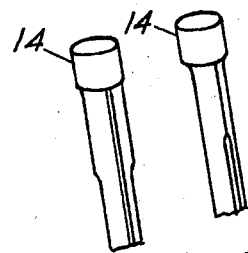
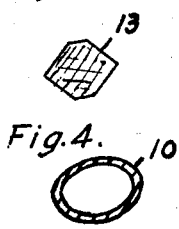
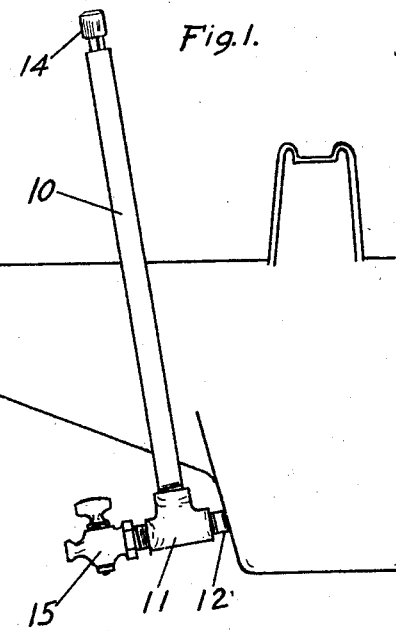
ALLEN A. ASHWORTH.
ROBERT V. QUICK.  INVENTORS.
BY Emil F. Lange  ATTORNEY.

Patented Dec. 4, 1923.

1,476,321

UNITED STATES PATENT OFFICE.

ALLEN A. ASHWORTH AND ROBERT V. QUICK, OF LINCOLN, NEBRASKA, ASSIGNORS OF ONE-THIRD TO (DR.) S. L. ASHWORTH, OF LINCOLN, NEBRASKA.

OIL GAUGE.

Application filed February 6, 1922. Serial No. 534,470.

*To all whom it may concern:*

Be it known that we, ALLEN A. ASHWORTH and ROBERT V. QUICK, citizens of the United States, residing at Lincoln, in the county of Lancaster and State of Nebraska, have invented certain new and useful Improvements in Oil Gauges, of which the following is a specification.

Our invention relates to oil gauges which are intended for the purpose of determining both the amount of lubricating oil remaining in the crank case of an internal combustion engine and the amount necessary to fill it to the requisite level, and our objects are First, to provide a gauge rod having both sets of readings, so that the operator can almost instantly determine how much oil he has and how much oil he needs.

Second, to provide a tube of such length that it will reach from the lower pet cock of the motor to a point within convenient reach of the operator.

Third, to provide a relation between the tube and the gauge rod that will permit the oil in the crank case to find its level in the tube without interference from compressed or rarefied air.

Fourth, to provide a locking arrangement between the tube and the rod which will effectively eliminate all rattling and other annoying noises.

With these and other objects in view, we will refer to the drawings, of which—

Figure 1 shows our invention applied to the lower pet cock of the crank case of an automobile engine.

Figures 2 and 3 are views of two sides of our gauge rod.

Figure 4 shows in somewhat exaggerated form the outline of the opening of our tube.

Figure 5 illustrates a modified detail of our gauge rod.

Our invention includes a tubular member 10 having a T joint 11 at its lower end and a nipple 12 connected with one end of the T joint. The tube 10 may be constructed of any length, but we prefer to make it just long enough to terminate on or near the floor of the car. The tube 10, T joint 11, and nipple 12 may be integral or they may be built up out of the elements as shown.

Fitting in the tubular member 10 is a gauge rod 13. This gauge rod is rectangular in cross section and has a diagonal equal to or slightly smaller than the diameter of the tube. The sharp edges of the rod are preferably slightly rounded. This however is not necessary, but it is necessary that the rod slide freely and easily in the tube without much play between the edges of the rod and the walls of the tube.

The gauge rod is graduated on any two sides, but preferably on opposite sides. One of the graduations indicates the number of quarts of oil that remain in the crank case and is accompanied by the words "There is." The other graduated side has on it the words "Put in" and indicates the number of quarts of oil required to bring the contents of the crank case up to normal. The gauge rod is somewhat longer than the tube 10 and terminates in a knob 14 or other convenient finger grip. When the gauge rod is fully thrust into the tube, the knob is appreciably above the mouth of the tube. If the rod were short enough to rest on the mouth of the tube, it would tend to interfere with the supply of air and thus cause the oil in the tube to be at a higher or lower level than that of the oil in the crank case. Especially in winter weather when the oil is cold and heavy, the oil would not readily find its level against compressed air, but our construction permits the ingress and egress of air and thus avoids changes in air pressure inside the tube.

To apply our invention to an automobile, we remove the lower pet cock 15 of the crank case and insert the nipple 12 in its place. We then thread the pet cock into the opposite opening in the T joint, or if preferred we close the opening in the T joint in any desired manner. For the reception of the upper end of the tube 10 we make an aperture in the floor of the car immediately above the T joint. In the Ford coupe this opening will be immediately to the front of the floor.

The utility and great convenience of our invention is readily apparent. The mouth of the tube 10 and the knob 14 are located in front of the driver of the car and on or near the floor within convenient reach. If at any time the driver wishes to find out how much oil there is in the crank case, he need only reach forward and remove the gauge rod. On the road when stopping at filling stations and garages, it is particularly useful. The driver has simply to look at the "Put in" side of his gauge rod and to order the requisite amount of oil, without the necessity of his leaving his seat in the car or calculating the amount of oil needed.

Rods of this character are subject to the vibrations of the car and their rattling tends to annoy and confuse the driver. One of the important features of our invention relates to a construction which effectively eliminates this rattling. The tube 10 is circular in cross section while the rod 13 is rectangular, the diagonal of the rectangular cross section being a trifle less than the diameter of the tube. In Figure 4 we show in exaggerated form the flattened mouth of the tube 10. As a matter of fact this flattening is so slight that it is not noticeable on casual inspection. The edges of the mouth are very slightly turned in. The rod may at any position of its length be given a partial turn, which wedges its corners in the mouth of the tube and holds it against rattling, even offering considerable resistance to the endwise movement. A partial turn in the opposite direction however releases the wedge and the rod is again freely slidable in the tube. In Figure 5 we have shown how two of the opposite edges may be cut away so as to form a modification of our wedge which adapts itself more readily to the elliptical form of mouth as shown in Figure 4.

Having thus described our invention and the manner in which it is applied and used, what we claim as new and desire to protect by Letters Patent of the United States is:—

An oil gauge for automobile engines, comprising a tubular member which is adapted to be attached to the crank case of the engine, the tubular member extending upward and through the floor of the automobile, and a gauge rod slidable in said tubular member, said tubular member being circular in cross section and said gauge rod being rectangular in cross section, the diameter of the circular cross section being slightly greater than the diagonal of the rectangular cross section, said tubular member terminating in an elliptical mouth at its upper end, the arrangement being such that a partial turn of the gauge rod will wedge the edges of the gauge rod in the elliptical mouth of the tubular member to prevent the sliding and the rattling of the gauge rod in the tubular member.

In testimony whereof we affix our signatures.

A. A. ASHWORTH.
ROBERT. V. QUICK.